Dec. 12, 1967
H. H. W. LOSTY
3,358,058
METHOD OF MANUFACTURE OF SHAPED ARTICLES FROM DISPERSIONS
OF CELLULOSIC AND LIKE MATERIALS
Filed April 13, 1967
3 Sheets-Sheet 1
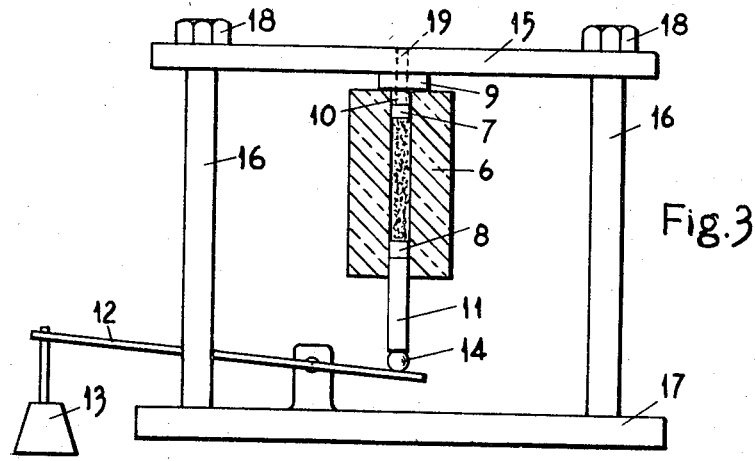
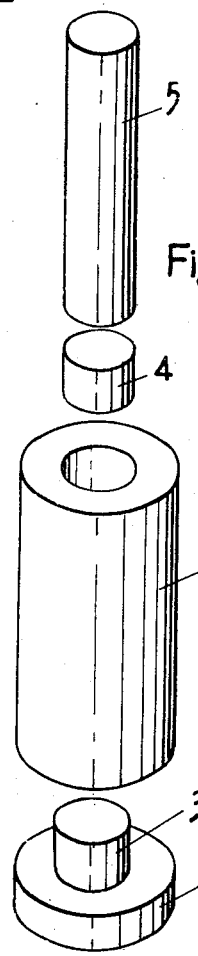
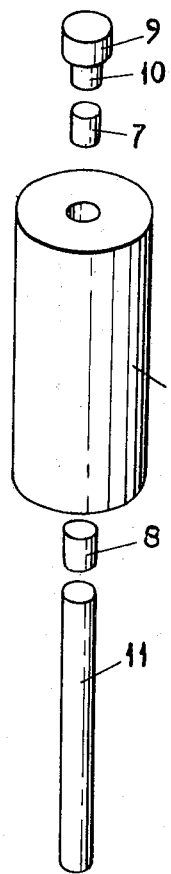
Inventor
By Harold Howard Walter Losty
Kirschstein, Kirschstein & Ottinger
Attorneys Dec. 12, 1967     H. H. W. LOSTY     3,358,058
METHOD OF MANUFACTURE OF SHAPED ARTICLES FROM DISPERSIONS
OF CELLULOSIC AND LIKE MATERIALS
Filed April 13, 1967     3 Sheets-Sheet 3

United States Patent Office 3,358,058
Patented Dec. 12, 1967

3,358,058
METHOD OF MANUFACTURE OF SHAPED ARTICLES FROM DISPERSIONS OF CELLULOSIC AND LIKE MATERIALS
Howard Harold Walter Losty, Watford, England, assignor to The General Electric Company, Limited, London, England, a British company
Filed Apr. 13, 1967, Ser. No. 630,671
Claims priority, application Great Britain, Dec. 15, 1961, 45,021/61
14 Claims. (Cl. 264—29)

ABSTRACT OF THE DISCLOSURE

A process for the production of a shaped article of regenerated cellulosic or hemicellulosic material, from a dispersion, in a liquid, of such material in a finely comminuted state, which comprises extracting liquid from the dispersion through a die formed of liquid-permeable graphite and moulding the residual material in the die, the liquid extraction being effected in one or more stages each comprising either evacuation or pressing techniques. The shaped articles so produced can be converted to carbon of low permeability to gases by heat treatment.

---

This invention relates to the manufacture of shaped articles from dispersions of cellulosic and hemicellulosic materials in liquid media, and this application is a continuation-in-part of application Serial No. 242,505 filed on December 5, 1962, in the name of Howard Harold Walter Losty. The invention is more particularly, but not exclusively, concerned with the production of such articles, of cellulosic and hemicellulosic materials, in a form and condition suitable for conversion to carbon of low permeability to gases by subsequent heat treatment. The invention also relates to apparatus for use in carrying out the process described, and to shaped articles, including shaped carbon articles, produced by the process.

In United States Letters Patent No. 3,104,159 issued to Hugh Wilson Davidson, September 17, 1963, for Production of Graphite and assigned to the assignee of the present application, there is described a process for the production of carbon by the carbonisation of a body obtained by regenerating cellulosic or hemicellulosic material from a dispersion of such material in a liquid: the term "cellulosic or hemicellulosic material" as used herein and in the appended claims is to be understood to mean material consisting wholly or predominantly of cellulose, or of hemicellulose, or of a mixture of cellulose and hemicellulose, including materials of the kind referred to in the said United States Letters Patent 3,104,-159, consisting essentially of xylans.

In the process described in the said United States Letters Patent 3,104,159, the cellulosic or hemicellulosic material is dispersed preferably in an aqueous liquid, which may consist of water alone or may contain a chemical dispersing agent such as zinc chloride; the dispersion is also preferably prepared by prolonged beating of the cellulosic or hemicellulosic material in the aqueous liquid, the proportion of said material in the aqueous liquid preferably being about 2% by volume.

The process described in the above-mentioned patent results in the production of carbon possessing low permeability to gases, which is of value for a number of purposes, for example for use in nuclear reactors; for example, one of the applications of this process consists in the construction of cans for containing fertile or fissile fuel for nuclear reactors.

The beating procedure described in the aforesaid United States Letters Patent 3,104,159 results in the comminution of the cellulosic or hemicellulosic material, the initial fibrous aggregations of cellulose and/or hemicellulose, which consist of bundles of fibres for example 10 to 100 millimetres in length, being broken up into individual fibres of diameter not greater than one micron and of length up to thirty times their diameter: where the liquid medium employed is an aqueous liquid, these individual fibres also become hydrated during the beating, that is to say they absorb water molecules which are loosely bound to the cellulose and/or hemicellulose fibres. These individual fibres of which the dispersed cellulosic or hemicellulosic material consists will hereinafter, and in the appended claims, be referred to as "fibrils."

In the process described in the said United States Letters Patent 3,104,159, the dispersed comminuted cellulosic or hemicellulosic material is regenerated, that is to say recovered from the dispersion, by removing the supernatant liquid, which in cases where an aqueous liquid is used comprises the free water which is not bound to the fibrils by hydration. In one preferred method, the aqueous dispersion is centrifuged, and the regenerated or partially regenerated cellulosic or hemicellulosic material can be withdrawn from the centrifuge in the form of a wet and pliable but coherent tube, which still contains the bound water of hydration and possibly part of the free water, and may be regarded as consisting of a concentrated dispersion of the hydrated, comminuted, cellulosic or hemicellulosic material. A drying step is subsequently carried out to remove the residual water, both free (if present) and bound, forming a tube of dried, regenerated cellulosic or hemicellulosic material. The pliable tube withdrawn from the centrifuge is preferably dried on a mandrel, for avoiding deformation which is liable to occur as a result of shrinkage during drying, as described in British Patent No. 946,246 granted to the assignee of the present application May 5, 1964, for improvements in or relating to a process for the production of tubular carbon articles.

The above-described process, comprising centrifuging the dispersion and drying the tube thus obtained, is only applicable to the manufacture of tubular bodies, or bodies of shapes which can be cut from tubes. For the production of bodies of other shapes, which cannot be derived from tubes, it would be necessary to remove the liquid from the dispersion through a porous die of appropriate shape and mould the residual regenerated cellulosic or hemicellulosic material in the die. However, it is not possible to employ dies formed of conventional porous die materials, which have relatively large pores, for the extraction of liquid from the dispersions of finely comminuted cellulosic and hemicellulosic materials consisting, as aforesaid, of fibrils not larger than one micron in diameter and thirty microns in length, since these very small fibrils would thus rapidly become blocked.

Accordingly these dispersions of very small cellulosic and hemicellulosic fibrils, which had not been produced prior to the invention of the aforesaid process by Hugh Wilson Davidson, have not hitherto been formed into articles of any shapes other than the tubes produced in the manner described in the said patent. It is an object of the present invention to provide an improved method of producing shaped articles of cellulosic and hemicellulosic materials regenerated from dispersions, in liquids, of such materials in the finely comminuted state as aforesaid, by which method articles of a variety of shapes, including tubular bodies, can be obtained. It is a further object of the invention to provide suitable apparatus for the production of such articles by the said method. A particular object of the invention is the provision of an improved method by which articles of a variety of shapes, composed of low permeability carbon derived from regenerated cellulosic or hemicellulosic material, can be produced.

I have found that these objects can be achieved by the use, for the extraction of liquid from the dispersion of finely comminuted cellulosic or hemicellulosic materials and moulding of the residual regenerated materials, of dies formed of liquid-permeable graphite which has a suitably small pore size.

According to the present invention, therefore, a process for the production of a shaped article from a dispersion in a liquid of cellulosic or hemicellulosic material in a comminuted state such that said material consists of individual fibrils, as hereinbefore defined, of diameter not greater than one micron and of length not greater than thirty microns, comprises extracting the liquid from the dispersion in at least one stage which includes the steps of placing a quantity of the said dispersion in a die of which at least a part of the wall is formed of liquid-permeable graphite having pores on the internal surface communicating with pores on the external surface through channels within the graphite, said pores and channels being of diameter not greater than ten microns and smaller than the lengths of the fibrils, then applying a pressure difference between the exterior of the die and the mass of dispersion within the die such that the dispersion is under higher pressure than the exterior of the die, so that liquid is extracted from the dispersion through the said liquid-permeable graphite wall of the die, the extracted liquid being removed rapidly from the vicinity of the die, and the residual material retained within the die is formed into a shape the exterior of which is determined by the shape of the interior of the die, and finally drying the said shaped residual material to give a shaped body of regenerated cellulosic or hemicellulosic material.

Water is the preferred liquid medium for the dispersion, and the initial dispersion is most suitably prepared by prolonged beating of the cellulosic or hemicellulosic material in a large volume of water such that the concentration of the dispersion is less than 5% by volume of solid material. When treated in this way, the initial fibrous aggregations of cellulose and hemicellulose are broken down into fibrils of the dimensions referred to above, and these fibrils absorb an appreciable amount of water of hydration, all of which is removed during the subsequent water extraction and drying steps of the process.

The starting material for the liquid extraction process of the invention may be the initial dilute dispersion of cellulosic or hemicellulosic material, such as is used as the starting material in the process described in the aforesaid prior patents, containing for example about 2% by volume of solid material. Alternatively, a more concentrated dispersion, or partially regenerated material, containing for example 10% or more, by volume, of solid material, obtained from the initial dispersion by removal of a proportion of the liquid in a centrifuge, but still wet and capable of plastic deformation, may initially be introduced into the graphite die.

The graphite employed for the wall, or part thereof, of the die used for the process of the invention, may be any good quality graphite characterised by the specific size of connected pores, that is to say pores connected by channels running between the opposite surfaces of the graphite: it is immaterial whether the channels run substantially straight, or pursue a tortuous path, from one surface to the other. One suitable type of graphite is, for example, electrode grade graphite, which usually has a mean conected pore diameter in the range of one to five microns. During the extraction of the liquid through the graphite, with the dispersion within the die under higher pressure than the exterior of the die, the dispersed cellulose and/or hemicellulose fibrils tend to orientate themselves across the direction of flow of the liquid and therefore, on coming into contact with the graphite surface, lie across the graphite pores, whose diameter is considerably smaller than the length of the fibrils, few, if any, of the fibrils meeting the graphite surface end-on and penetrating into the pores.

It is essential that the liquid extracted through the graphite is rapidly removed from the vicinity of the exterior of the die, in order to avoid the possibility of any resistance to the passage of further liquid through the graphite. The means employed for removing the liquid will depend upon the construction of the die and any equipment associated with it, channels being provided, if necessary, for enabling the liquid to flow away from the die.

In one method of carrying out the invention, the dispersion within the dies is subjected to superatmospheric pressure while the exterior of the die is under ordinary atmospheric pressure. Thus a suitable form of apparatus for use in carrying out this method comprises, in addition to a suitably shaped die of which the wall, or part of the wall, is formed of liquid-permeable graphite as aforesaid, one or more plungers insertable within the die cavity and of a shape corresponding to that of the die cavity, and means for applying to the plunger or plungers sufficiently high pressure to cause at least the greater part of the liquid medium of the dispersion to be expressed through the graphite wall of the die, and to compress the residual material retained in the die to form a compacted mass of regenerated cellulosic or hemicellulosic material. The said compacted mass will be of a shape and size determined by the shapes of the die cavity and of the plunger or plungers, and by the pressure applied.

Preferably the plunger (or plungers) employed for the pressing method, or at least the end portion of the plunger which will come into contact with the dispersion in operation, is formed of the same liquid-permeable graphite as the wall, or part of the wall, of the die. It is not always necessary for the plunger to fit tightly within the die cavity, provided that the pressing is carried out in such a manner that the plunger is inserted into the die cavity at a slow rate: under these conditions, as the liquid is expressed from the region of the dispersion immediately adjacent to the plunger, the residual pressed cellulosic or hemicellulosic material will tend to form a dry seal between the plunger and the die cavity wall, thus preventing liquid or dispersion from emerging through the space between the plunger and the die wall during the remainder of the pressing operation. If, however, the plunger is moved rapidly into the die cavity, it is desirable that it should be a close fit within the die cavity, to prevent penetration of the dispersed fibrils between the plunger and the die wall.

In an alternative method of carrying out the invention, the difference in pressure on the dispersion and on the exterior of the die is produced by applying reduced pressure to the die. It may be arranged that the interior of the die, containing the dispersion, is maintained substantially under atmospheric pressure while reduced pressure is applied to the exterior of the die, but conveniently the filled die is enclosed in a vacuum-tight vessel which is then evacuated, the air initially present in the dispersion providing sufficient pressure to enable the liquid to be drawn through the graphite die wall by the vacuum. This evacuation method is preferred when the inital dispersion has been prepared by a beating technique which results in the entrainment of appreciable quantities of air in the dispersion, since the evacuation process results in the removal of the entrained air from the dispersion: moreover the entrained air ensures the provision of adequate pressure for ensuring rapid withdrawal of the liquid through the graphite die wall. This removal of entrained air gives a product free from large pores and other defects which may be present if all the entrained air has not been removed. In order to accelerate the removal of air from the dispersion, it is preferred to subject the vacuum chamber, during the evacuation process, to agitation, for example by repeatedly tapping the bottom of the chamber on the floor or base of a support structure for the chamber, at intervals of approximately one to two seconds.

Graphite possesses other properties which render it advantageous for use as a die material in the process of the invention, in addition to having pores of sizes which permit rapid withdrawal of liquid from the dispersion under the application of a pressure difference as aforesaid, while avoiding obstruction of the pores by the fibrils. One important characteristic of graphite in this connection is its self-lubricating property, which in the first place makes it possible to press the dispersion with a plunger fitting closely within the die, such a close fit being desirable in some circumstances as indicated above, and which secondly prevents the residual compacted mass of cellulosic or hemicellulosic material, remaining in the die after removal of the liquid, from sticking to the die wall or from being scored by contact therewith, so that the compacted mass can be removed from the die without difficulty, and has a smooth outer surface.

Further properties which render graphite advantageous for use as a die material are its mechanical strength, which is adequate for withstanding the pressures applied in this process and which enables it to be machined to form a die of any required shape; and its resistance to corrosion by liquids or air. No other porous material which might be used for the construction of dies posesses all of these advantages. Thus although other porous materials of high mechanical strength and machinability are known, for example porous metals, these do not possess sufficiently small pores and in some cases are prone to chemical attack, and moreover no such materials possess the self-lubricating property which is specific to graphite.

All the graphite parts of the die are preferably washed with water immediately before use, the die being assembled while the graphite surfaces are still wet: this assists in preventing contamination of the compressed cellulosic or hemicellulosic material with carbon; however, if the articles produced in the die are to be subsequently carbonised, any such contamination which may occur is immaterial.

The die may be wholly formed of the said liquid-permeable graphite, or alternatively the die may be mainly constructed of conventional material, such as steel, and provided with a liner or inserts of the graphite. In the latter case the die must be so arranged and constructed that the liquid expressed from all regions of the dispersion within the die cavity will readily find an outlet through a graphite portion of the die wall: for example, graphite inserts may be located in positions substantially parallel to one another along opposite sides of the die cavity. Moreover, as stated above, the arrangement must be such that the liquid passing through the graphite part of the wall during the extraction process is rapidly removed from the vicinity of the graphite: for example, suitable channels for the flow of liquid may be provided in the die wall adjacent to the graphite liner or inserts, although in some cases, where part of the exterior surface or surfaces of the liner or inserts is exposed on the outside of the die, the provision of such channels may not be necessary.

The liquid extraction process may be effected in a single step or, especially if the dispersion initially has a very low solid content, for example less than 5% by volume, the liquid may be extracted in two or more stages. Thus a major proportion of the liquid may be first extracted either by the evacuation technique or by the application of relatively low pressure to the dispersion, to give a material still containing an appreciable proportion of liquid and therefore of a consistency such that it is capable of plastic deformation, this material then being subjected to one or more further pressing operations, under higher pressures than that used for the first stage if this was effected by pressing. If desired, both or all of the liquid extraction stages may be carried out in the same die; alternatively, the first stage may be carried out in a die of simple shape, to produce a block of plastic partially regenerated cellulosic or hemicellulosic material containing from 10% to 40%, by volume, of solid material, which can then be tranferred into a die of the desired shape of the article to be produced, in which the liquid extraction process is completed by pressing.

If desired, when the inital dispersion contains a low proportion, for example less than 5% by volume of solid material, part of the liquid can be first extracted from the dispersion by a preliminary filtering or centrifuging step, instead of using a preliminary stage of evacuation or application of low pressure, to produce partially regenerated material in a wet, plastic state, containing from 10% to 40%, by volume, of solid material. This material is then placed in a die of the required shape and subjected either to the evacuation procedure or to a single pressing step under relatively high pressure. Preferably, however, a pressing process for the second liquid extraction stage is preceded by an evacuation process, for removal of entrained air from the dispersion as aforesaid. In an advantageous modification of this procedure, the greater part of the liquid is extracted from the dispersion by evacuation of the die, enclosed in a vacuum chamber, the chamber and the die are then filled with water, and the relatively dilute dispersion thus reformed in the die is then pressed by means of a plunger inserted through the top of the vacuum chamber, the whole process being carried out without exposure of the die and its contents to the atmosphere.

The process in accordance with the invention can be used to produce articles, of regenerated cellulosic and hemicellulosic materials, of a wide variety of shapes, by using suitably shaped dies, and provides a convenient method of producing tubular articles. For forming a tube, a cylindrical die provided with a central mandrel is used, and either the die is filled with a dilute or concentrated dispersion of cellulosic or hemicellulosic material, or a tube of partially regenerated material produced by centrifuging such a dispersion is inserted in the die over the mandrel; the liquid is then extracted from the dispersion or tube by the evacuation technique, and during the extraction process the residual material in the die shrinks on to the mandrel in the manner described in the specification of the said British Patent No. 946,246.

If desired, the liquid extraction may be carried out at an elevated temperature for effecting concentration of the dispersion more rapidly. Usually, if the liquid extraction is carried out in two or more stages, the dispersion is maintained at room temperature for the first stage, and is then heated for the subsequent stage or stages.

After completion of the liquid extraction process, it is necessary finally to dry the shaped article produced, for example in an oven. Usually, the compacted shaped body produced by evacuation and/or pressing as described is substantially rigid and can easily be removed from the die and further handled and dried without risk of deformation. Furthermore, by pressing substantially to dryness, it can be arranged that very little shrinkage takes place during the final drying. The article can, if desired, be machined after the final drying, for accurate adjustment of the dimensions, or for making any desired modification of the shape.

For the production of a shaped article of low permeability carbon, an article of dry regenerated cellulosic or like material, of the desired shape, is produced as described above, and is then subjected to a carbonisation process as described in the aforesaid United States Letters Patent No. 3,104,159. I have found that carbon bodies manufactured by the process of the present invention possess similar properties, in respect of permeability, electrical conductivity, and mechanical strength, to those of carbon bodies produced by the processes described in the aforesaid prior specifications, the present process being advantageous in that it enables bodies of any desired size and shape, formed of substantially dry regenerated cellulosic or hemicellulosic material, to be produced. Since some shrinkage will take place during the carbonisation process, allowance should be made for this in the production of regenated cellulosic or hemicellulosic articles which are to be nverted to carbon.

Some specific methods of carrying out the process in cordance with the invention, which I employ for the anufacture of articles of regenerated hemicellulosic material, of various shapes, will now be described by way of ample, together with particular forms of apparatus which have employed for the production of certain shapes, d which are shown in the accompanying drawings.

In the drawings,

FIGURE 1 shows the apparatus, comprising a die and unger arrangement, employed for the first pressing stage the processes described in Examples 1 and 2, below;

FIGURE 2 shows a die and plunger assembly employed r the second pressing stage in the production of a disc f regenerated hemicellulosic material as described in xample 1;

FIGURE 3 shows the apparatus used for carrying out e pressing step in conjunction with the die of FIG-RE 2;

Figure 5:
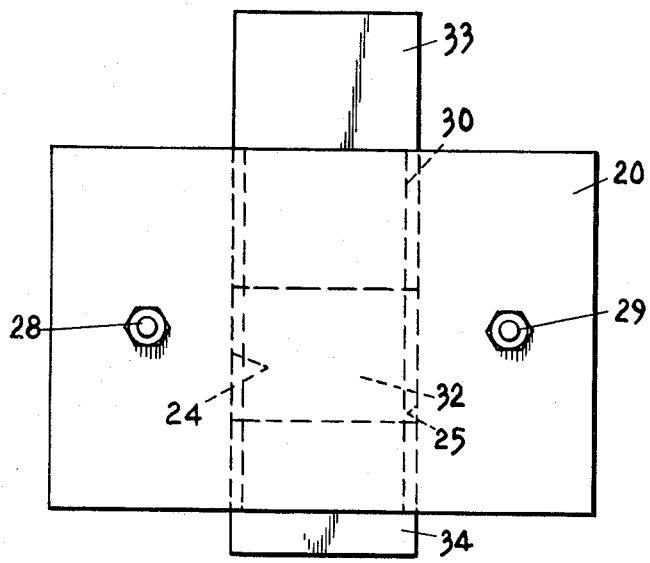
FIGURES 4 and 5 are, respectively, a plan view and a ont elevation of the apparatus employed for producing trips of regenerated hemicellulosic material, in accordnce with Example 2.

The starting material employed for all the methods to be described in the examples consists of lignin-free, bleached and purified hemicellulosic pulp, consisting of a mixture of cellulose and hemicellulose, which is comminuted by beating for 8 hours in a standard Hollander type beater, as used in the paper-making industry, to produce a viscous dispersion in water of hydrated cellulose and hemicellulose fibrils of diameter not greater than one micron and of length not greater than 30 microns: the concentration of this dispersion is such as to give approximately 2% by volume of dried solid material. It is to be understood, however, that the methods described in the examples can equally well be carried out using other similarly pulped cellulosic material, for example substantially pure cellulose free from xylans.

Example 1

The beaten pulp, prepared as described above, is pressed in two stages, to form discs of substantially dry regenerated hemicellulosic material. The apparatus employed for the first pressing stage is shown, in an exploded perspective view, in FIGURE 1 of the drawings, and comprises a die consisting of a cylindrical tube 1, formed of electrode grade graphite having pores of diameters in the range of 1 to 5 microns running between the internal and external surfaces of the graphite, the graphite wall of the tube being one inch thick. One end of the tube 1 is provided with a cap 2, with an integral plug 3, fitting within the tube, the cap and plug being formed of the same graphite as the tube itself. A short plunger 4 also formed of the same graphite as the tube, fits within the other end of the tube, and a longer steel plunger 5, is provided for applying pressure to the graphite plunger 4.

It is to be understood that all graphite parts of apparatus described in this and the following examples are formed of the said electrode grade graphite.

The graphite tube 1, with cap and plug 2, 3 in position, is filled with the beaten hemicellulosic pulp, the graphite and steel plungers are placed in position at the open end of the tube, and a pressure of 110 lbs./sq.in. is applied to the steel plunger 5. This pressing operation is carried out at room temperature, and the application of pressure is continued for the length of time required to produce the desired degree of concentration of the pulp, usually in the range of 10 minutes to one hour: we have found that, with a pressure of 110 lbs./sq. inch, the degree of concentration obtained is related to the pressing time in the following way, the degree of concentration being expressed as the compression ratio, that is to say the ratio of the initial volume to the final volume:

Pressing for 10 minutes gives compression ratio of 2.4:1
Pressing for 20 minutes gives compression ratio of 4:1
Pressing for 30 minutes gives compression ratio of 7:1
Pressing for 1 hour gives compression ratio of 16:1
Pressing for 16 hours gives compression ratio of 24:1

If the pulp is pressed to a compression ratio of 15:1 or more (that is to say, to a solid content of 30% or more, by volume), the pressed body is sufficiently rigid to be transferred directly to an oven for drying, provided that the body so produced is of the desired final shape. It is preferred, however, in accordance with the invention, to subject the partially concentrated pulp to a second pressing step in a second die which will produce a body of the desired final shape: if the compression ratio achieved in the first pressing step is in the range of 5:1 to 20:1, the material is of such a consistency that it can be kneaded into a second die of the desired shape. Preferably the first pressing operation is continued until a compression ratio of 5:1 to 10:1 is obtained, giving a pulp of solid content 10% to 20% by volume.

For the production of a disc of regenerated hemicellulosic material, the cylindrical body of concentrated pulp, with 10% to 20% solid content, produced by the first pressing operation described above, is transferred to a second die, which is shown, again in exploded perspective view, in FIGURE 2 of the drawings: this die comprises a graphite tube 6 of somewhat smaller internal diameter than that employed for the first pressing step; a graphite plunger 7, 8 is fitted into each end of the tube 6, and one end is closed by a graphite cap and plug 9, 10, similar to those described above, while an additional steel plunger 11 is provided for applying pressure to the graphite plunger 8 at the other end. The assembly is heated to approximately 100° C. by means of a hot air blast, and a pressure of 3000 lbs./sq. in. is applied to the steel plunger 11; the pressure is maintained for a period of ½ hour to 4 hours, 2 hours being the most usual length of time, and the assembly is allowed to cool to room temperature before the pressure is released.

On completion of the second pressing step, the pulp has been compressed to a rigid, substantially dry, disc of regenerated hemicellulosic material which is finally dried in a drying cabinet at 80° C. for 24 hours.

In a specific apparatus of the form described above, and shown in FIGURES 1 and 2, which we have used for the production of hemicellulosic discs of diameter ¾ inch and ¼ inch thick, the graphite tube 1 used for the first pressing step was 6 inches long and had an external diameter of 3½ inches and internal diameter of 1½ inches; a graphite cap 2, ½ inch thick fitted over one end of the tube 1 and the graphite plug 3 integral therewith was 1 inch long and 1½ inches in diameter; the graphite plunger 4 was 1 inch long and 1½ inches in diameter, and the steel plunger 5 was 6 inches long and 1½ inches in diameter. The graphite tube 6, used for the second pressing step was 6 inches long, with external diameter 3 inches and internal diameter ¾ inch, and was fitted with graphite plungers 7 and 8, each ¾ inch long and ¾ inch in diameter, a graphite cap 9, ½ inch thick with integral plug ½ inch long and ¾ inch in diameter, and a steel plunger 11, 6 inches long and ¾ inch in diameter. In the first pressing step, the pressure was applied directly to the steel plunger 5 by means of an appropriate load.

The second pressing step was effected by means of the apparatus shown in section in FIGURE 3 of the drawings; the pressure was applied to the steel plunger 11, fitted into the bottom end of the tube 6, through a lever 12, of ratio 13:1, loaded with the required weight 13, of 110 lbs. to give a pressure of 3000 lbs./sq. in. on the end of the steel plunger 11, a steel ball 14 being inserted between the steel plunger and the lever. During the pressing the graphite cap 9 was held in position on the top of the tube 6 by means of a stout steel bar 15, the ends of which were located on steel rods 16 fixed to a base plate 17, the position of the steel bar 15 being fixed by means of nuts 18. A hole 19 was provided in the steel bar 15, for the insertion of a thermometer. The whole apparatus was mounted within a furnace through which hot air was arranged to flow during the pressing operation.

EXAMPLE 2

For the production of strips of regenerated hemicellulosic material, the beaten pulp is first concentrated to a solid content of 20% by volume, using a graphite die of the kind shown in FIGURE 1 and the method described in Example 1. The cylindrical block of concentrated pulp thus obtained is subjected to a second pressing operation, to convert it to a substantially rigid strip of hemicellulosic material, in an apparatus of the form shown in FIGURES 4 and 5 of the drawings.

Figure 4:
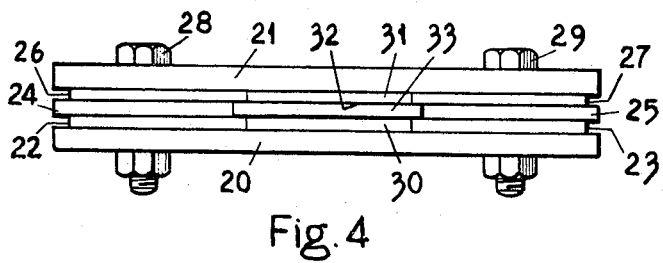

Referring to the drawings, in which FIGURE 4 shows a plan view, and FIGURE 5 a front elevation, the apparatus comprises a steel die formed of two outer steel plates 20 and 21, and three inner pairs of shorter steel plates 22, 23, 24, 25 and 26, 27, the assembly of steel plates being held together by bolts 28 and 29. Two graphite plates 30 and 31 are inserted between the pairs of steel plates 22, 23 and 26, 27 on either side of the die cavity 32, which is also bounded by edges of the steel plates 24 and 25. Two plungers in the form of steel plates 33 and 34 are provided for sliding into the die cavity between the graphite plates, as shown in FIGURE 5.

For the production of a strip of hemicellulosic material, the block of concentrated pulp obtained as a result of the first pressing step is placed in the die cavity 32 and the pressing is carried out by means of apparatus of the form shown in FIGURE 3 and described in Example 1, the lower plunger 34 being acted on by the lever 12 while the top plunger 33 is held in a fixed position by the steel bar 15. A pressure of 3000 lbs./sq. in. is applied to the lower plunger 34, for a period of ¼ to 1 hour, while the pulp is heated to 80° C., by a hot air blast, and the pressure is maintained, in a static condition, until the pressed hemicellulosic strip has cooled to room temperature. The strip is finally dried at 80° C. for 24 hours.

A hemicellulosic strip of any desired dimensions can be produced by this method, the dimensions of the die and the pressing conditions being arranged accordingly: thus the thickness and length of the strip will be determined respectively by the distance between the graphite inserts and the length of the die cavity between the graphite inserts, which is slightly less than the distance between the edges of the steel plates 24 and 25, and the width of the strip will be determined by the final distance between the plungers, that is to say by the pressure applied and the duration of the pressing in relation to the volume and concentration of the pulp initially fed into the die. In a specific example of this method, a strip of regenerated hemicellulosic material ⅛ inch thick, 1¾ inches long and ⅛ inch wide was produced from 4 ml. of 20% vol./vol. pulp, under the pressure and temperature conditions described above, in a die in which the outer plates 20 and 21 were ¼ inch thick, 6 inches long and 4 inches high, the inner plates 22, 23, 24, 25, 26 and 27 were ⅛ inch thick, 2 inches long and 4 inches high, the graphite inserts 30 and 31 were ⅛ inch thick, 1¾ inches long (in the horizontal dimension) and 4 inches high, and the plungers 33 and 34 were each ⅛ inch thick, 2 inches long (in the horizontal dimension) and 3 inches and 1½ inches high respectively. The manner in which the dimensions of the various parts of the apparatus are described in this specific example is based on the assumption that the die is used in the position indicated in FIGURES 4 and 5 of the drawings, that is to say in such a position that the pressure is applied in the vertical direction, although of course the die could be used in a different position if desired.

EXAMPLE 3

Figure 6:
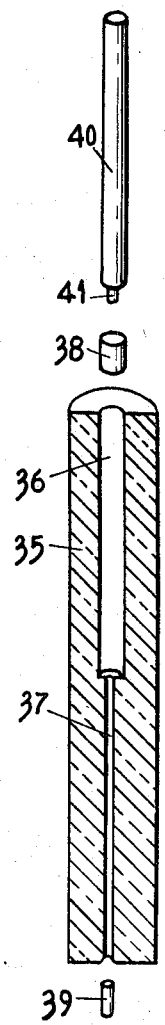
FIGURE 6 shows the apparatus employed for the production of a rod of regenerated hemicellulosic material as lescribed in Example 3, below.

A solid rod of regenerated hemicellulosic material is produced by means of apparatus of the form shown in FIGURE 6 of the drawings. This apparatus, which is shown in part-sectional elevation, consists essentially of a graphite die 35, having a cavity formed by boring a hole through the centre of a cylindrical block, the die cavity being of relatively large diameter for half its length 36, while the other half 37 of the length of the cavity is of considerably smaller diameter. Graphite plugs 38 and 39 fit respectively within the wider part 36 and the narrower part 37 of the cavity, and a steel plunger 40, which is mainly of a diameter such that it will fit within the wider part 36 of the cavity but which has a short extension 41 which will fit within the narrower part 37 of the cavity, is also provided.

In operation of the apparatus shown in FIGURE 6, the small graphite plug 39 is inserted into the narrow end of the die cavity 37, the cavity is filled with the beaten hemicellulosic pulp, and the larger graphite plug 38 is then pushed along the wider part of the cavity under a pressure of 130 to 260 lbs./sq.in., to effect the initial concentration of the pulp: this initial pressing operation is carried out slowly, the plug 38 suitably being moved along the die cavity at a rate of one foot per hour, to allow the pulp to form a dry seal between the plug and the interior surface of the die. When the graphite plug 38 reaches the inner end of the wide part 36 of the die cavity, it is removed and the steel plunger 40 is inserted in its place, the extension 41 being pressed into the narrow part 37 of the cavity. The small graphite plug 39 is then forced along the narrow tube 37 under a pressure of 1800 to 4500 lbs./sq.in., and the pressure is maintained, as a static load, for a period of at least two hours, and even up to 2 to 3 days if a very high degree of concentration of the hemicellulosic material is desired. The process may be carried out at room temperature, or if it is desired to promote more rapid concentration of the pulp, the die may be subjected to a hot air blast, raising the pulp to a temperature up to 100° C., during the pressing process.

In a specific example of an apparatus of the form shown in FIGURE 6, which I have employed for the production of rigid hemicellulosic rods of diameter ⅜ inch and 2 inches long, the graphite die was 2 feet in length and 3½ inches in external diameter, the wide part 36 and the narrow part 37 of the die cavity were respectively 1 inch and ⅜ inch in diameter, the graphite plugs 38 and 39 were respectively substantially 1 inch and ⅜ inch in diameter and were both 1 inch long, and the steel plunger 40 was 1 inch in diameter and 15 inches long, with an extension 41 which was ⅜ inch in diameter and ⅜ inch in additional length.

The rods produced by the method described above may, if necessary, be finally dried in an oven at 80° C. for 24 hours.

*Example 4*

Figure 7:
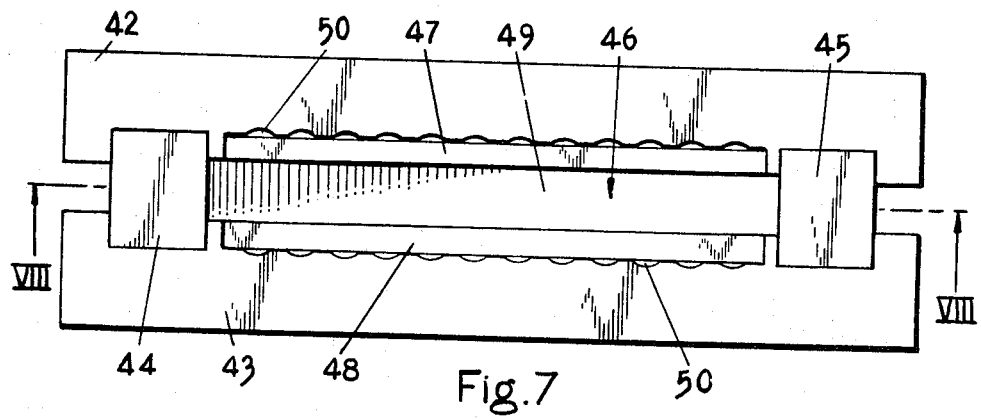
FIGURES 7 and 8 are, respectively, a plan view and a ectional elevation of a die used for the production of locks or plates of regenerated hemicellulosic material, s described in Example 4, below.
Figure 8:
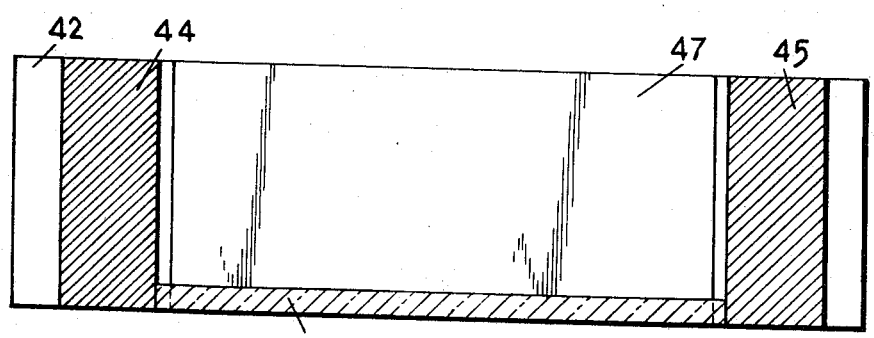

A die of the form shown in FIGURES 7 and 8 of the drawings is suitable for use for the production of blocks or plates of regenerated hemicellulosic material: FIGURE 7 is a plan view of the die, and FIGURE 8 is a section drawn on the line VIII—VIII of FIGURE 7. The die consists of two steel side plates 42 and 43, and two end blocks 44 and 45, which fit into recesses in the plates 42 and 43 for locating the plates in the correct position in relation to one another. The blocks 44 and 45 define the ends of the die cavity 46, and the plates 42 and 43 are recessed to receive graphite plates 47 and which form the sides of the die cavity; the base of the die cavity is formed by a further graphite plate 49. Grooves 50 are provided in the plates 42 and 43, for permitting water emerging through the graphite plates 47 and 48 during pressing to flow away. When the die is assembled, the parts are held together by means of clamps, not shown in the drawings, applied to the outer surfaces of the plates 42 and 43. Pressing is effected by means of a plunger of the same dimensions as the die cavity, which has also been omitted from the drawing: the plunger is formed of steel, preferably faced with a graphite plate.

It will be appreciated that the length, depth and width of the die cavity can be adjusted as desired for producing a hemicellulosic block or plate of any desired dimensions. In a specific example of apparatus of this form, for producing a plate 6 inches long, 1 inch wide, and ¼ inch thick, the external dimensions of the assembled die are 9½ inches in length, 3½ inches in width, and 2¾ inches in depth; the die cavity is 6 inches long, 1 inch wide and 2¾ inches deep, the graphite side plates 47 and 48 are 5¼ inches long, 2¾ inches deep and ¼ inch thick, and the graphite base plate 49 is 6 inches long, 1 inch wide and ¼ inch thick. The plunger consists of a block of steel 6 inches long, 1 inch wide and 2½ inches deep with a face plate of ¼ inch thick graphite.

For the manufacture of a plate of hemicellulosic material, a block of partially concentrated hemicellulosic pulp is first produced by a preliminary pressing operation. It is convenient to produce initially a relatively large block, which can be cut into portions for producing a plurality of plates by the second pressing step. In a specific example, a tubular die substantially of the form shown in FIGURE 1 and described in Example 1, above, but formed from a block of graphite 30 inches long and 3 inches square in cross-section, with a die cavity of diameter 5 inches, was used for the first pressing step. One end of the cavity was closed by a graphite cap with a graphite plug extending for one inch into the cavity, and the tube was filled to within 3 inches of the top with beaten hemicellulosic pulp, taking approximately 8 litres of the pulp. A graphite plunger 5 inches in diameter and 3 inches long was inserted into the top of the tube, and was pressed down by a steel plunger under a load of 110 lbs./sq. in. The pressure was maintained until the volume of the pulp was reduced to one-tenth of its initial volume, which took 1 to 3 hours. The resulting cylindrical block of concentrated pulp, containing 20% solid material, was ejected from the die by removing the cap and forcing the plunger through the die cavity under pressure.

The block of concentrated pulp was divided into four equal portions, each portion being of a suitable size for converting into a plate of regenerated hemicellulosic material, using a die of the form shown in FIGURES 7 and 8 of the drawings and of the dimensions described above. The concentrated pulp was of such a consistency that it could be kneaded into the said die by hand, filling approximately three-quarters of the die cavity. The steel plunger with graphite face plate was inserted into the top of the die cavity, and was subjected to a pressure of 2000 to 3000 lbs./sq. in. for 1 to 3 hours, until the rate of movement of the plunger was reduced to 10 thousand per minute, or less and the volume of the pressed hemicellulosic material was not more than one-fifth of the volume initially introduced into the die. The substantially rigid plate of regenerated hemicellulosic material thus produced was extracted from the die by removing the graphite base plate and forcing the plunger through the cavity. The plate was finally dried at 80° C. for 24 hours.

*Example 5*

In a specific method of extracting the water from the hemicellulosic dispersion, using the evacuation technique, 5 litres of the beaten pulp, contained 2% by volume of solid material, are placed in a 4 inch internal diameter graphite tube, which is enclosed in a cylindrical vacuum vessel. The vessel is evacuated for 30 minutes, the pressure within the vessel being reduced to 4–5 cm. of mercury; during the evacuation the vessel is intermittently raised and lowered, so that the bottom of the vessel strikes the base of the support structure with considerable force approximately once every two seconds. The residual mass of substantially regenerated hemicellulosic material is allowed to dry in an air oven at 70° C., to give an irregular block approximately two inches in diameter and one inch in length, having a density exceeding 1.5. The green hemicellulosic blocks so produced have been machined into a variety of shapes, for example discs, crucibles, sealing rings and tubes.

*Example 6*

The mass of wet hemicellulosic material resulting from the evacuation process described in Example 5 is transferred to a smaller graphite die, and is pressed by means of a suitably shaped graphite plunger surmounted by a steel plunger, in a manner similar to that described in Example 1 with reference to FIGURE 2 of the drawings. The product of this pressing step is a disc 3 inches in diameter and ½ inch thick, which is strong enough to be machined to any desired shape.

*Example 7*

For the production of a tube of regenerated hemicellulosic material by the evacuation technique, the die employed is a graphite cylinder, or a stainless steel cylinder with a graphite base, provided with a central stainless steel mandrel. In a particular example, a stainless steel cylinder of internal diameter, 1¾ inches with a graphite base, with a central mandrel of diameter 3/16 inch was filled with concentrated hemicellulosic pulp containing 10%, by volume, of solid material, and was placed in a vacuum vessel and evacuated in the manner described in Example 5. The product was a dense green tube of external diameter 7/16 inch with a central channel corresponding to the mandrel used; the shrinkage in length which occurred as a result of the extraction of the water was 30%. The tube was dried in an oven at 70° C., and then machined to final dimensions of ⅜ inch external diameter, 3/10 inch internal diameter, and length 4½ inches.

*Example 8*

A quantity of the beaten hemicellulosic pulp (2% solid) is centrifuged to produce a wet, pliable tube of partially regenerated material containing about 10% by volume of solids, and this tube is placed on a stainless steel mandrel of slightly smaller diameter than the internal diameter of the tube, one end of the tube projecting beyond the mandrel. The assembly is placed in a closely fitting graphite cylinder and subjected to an evacuation procedure as described in Example 5, during which the projecting end of the tube is moulded to form a solid base to the tube. The cylindrical vessel of hemicellulosic material so formed is finally dried in an oven at 70° C.

*Example 9*

A wet, pliable tube of partially regenerated hemicellulosic material is produced by centrifuging the initial beaten pulp, as described in Example 8, and is then pushed into a graphite cylinder, or a stainless steel cylinder with a graphite base, to form an irregularly shaped mass of plastic pulp in the bottom of the cylinder, and is subjected to an evacuation procedure as described in Example 5, to produce a cylindrical block of regenerated material. The vacuum is then released, and a graphite-ended plunger is inserted into the top of the cylinder, pressure being applied to the plunger to compress the block to a substantially water-free disc, which is then removed from the cylinder and finally dried in an oven at 70° C.

All the articles produced by the methods described in the examples can be converted to articles of corresponding shapes composed of carbon of low permeability to gases, by a suitable carbonisation process. Since a high degree of compression of the regenerated cellulosic or like material can be achieved by the process of the invention, the products being substantially dry and rigid, subsequent handling of the articles for carrying out the carbonisation does not present any difficulties.

The preferred carbonisation procedure comprises the steps of heating slowly to 450° C. in an atmosphere of nitrogen at a pressure of up to 200 atmospheres, the pressure being released slowly after the heating, then heating to 750° C. in vacuum, and finally baking at 1500° C. to 2000° C. in an inert atmosphere. The product thus obtained is partially graphitised, and if complete graphitisation is desired a further firing treatment, at a temperature up to 2600° C., is carried out. The details of these procedures are described in the prior patent specifications mentioned above.

Carbon discs produced by the method described in the foregoing Example 1, and tubes produced by the method of Example 7 in each case followed by the carbonisation treatment described above, with a final baking at 1500° C., have been found to possess a helium permeability of less than $10^{-12}$ cm.$^2$/sec.; and strips produced by the method of Example 2 followed by carbonisation have been found to have a specific electrical resistance of $4 \times 10^{-3}$ ohm-cm. and a bend strength in the range of 15,000 to 25,000 lbs./sq. in.

I claim:

1. A process for the production of a shaped article from a dispersion in a liquid medium of a material which is a member of the group consisting of cellulosic and hemicellulosic materials, said dispersed material being in a comminuted state such that it consists of individual fibrils of diameter not greater than one micron and of length not greater than thirty microns, which process includes the steps of:
    (A) extracting liquid from the dipersion in at least one stage which comprises
        (I) placing a quantity of the said dispersion in a die (a) of which at least a part of the wall is formed of liquid-permeable graphite having pores on the internal surface communicating with pores on the external surface through channels within the graphite, said pores and channels being of diameter not greater than ten microns and smaller than the lengths of the fibrils, and
        (II) applying a pressure difference between the exterior of the die and the mass of dispersion within the die (a) such that the dispersion is under higher pressure than the exterior of the die, (i) so that liquid is extracted from the dispersion through the said liquid-permeable graphite wall of the die, (ii) the extracted liquid being removed rapidly from the vicinity of the die, and (iii) the residual material retained within the die is formed into a shape the exterior of which is determined by the shape of the interior of the die,
    (B) Drying the said residual material to give a shaped body of regenerated material of the group consisting of cellulosic and hemicellulosic materials.

2. A process according to claim 1,
    (A) wherein the said dispersion initially contains less than 5% by volume of dispersed material and
    (B) wherein, prior to the step of placing the dispersion in the said die, part of the liquid is extracted from the initial dispersion to reduce the solid content of the dispersion to between 10% and 40% by volume.

3. A process according to claim 1,
    (A) wherein a said liquid extraction stage comprises maintaining the exterior of the die under atmospheric pressure while superatmospheric pressure is applied to the dispersion within the die by means of a plunger
        (I) insertable within the die cavity and of a shape corresponding to that of the die cavity, and
        (II) having at least its end portion which will come into contact with the dispersion during the pressing operation formed of liquid-permeable graphite, which is the same as that of the die wall.

4. A process according to claim 1,
    (A) wherein the said dispersion has been prepared by beating a mixture of said material and liquid medium in such a manner that entrainment of an appreciable quantity of air in the dispersion takes place, and
    (B) wherein a said liquid extraction stage comprises the steps of
        (I) enclosing the said die containing the dispersion in a vacuum-tight vessel and
        (II) evacuating the said vessel,
        (III) the pressure difference between the exterior of the die and the mass of dispersion within the die being produced by virtue of the pressure exerted on the dispersion by the air entrained therein, and
        (IV) the said entrained air being extracted with the liquid through the said graphite wall of the die.

5. A process according to claim 4, wherein the evacuated vessel is subjected to agitation during the evacuation process.

6. A process according to claim 1,
    (A) wherein the extraction of liquid from the said dispersion is effected in a plurality of stages,
    (B) wherein the dispersion has been prepared by beating a mixture of said material and liquid medium in such a manner that entrainment of an appreciable quantity of air in the dispersion takes place, and
    (C) wherein the first liquid extraction stage comprises the steps of
        (I) enclosing the said die containing the dispersion in a vacuum-tight vessel and
        (II) evacuating the vessel,
        (III) a pressure difference between the exterior of the die and the mass of dispersion within the die being produced by virtue of the pressure exerted on the dispersion by the air entrained therein, and
        (IV) the said entrained air being extracted with the liquid through the said graphite wall of the dies; and
    (D) the second and any subsequent liquid extraction stage comprises the step of applying super atmospheric pressure to the mass of dispersion within the die while the exterior of the die is under substantially atmospheric pressure.

7. A process according to claim 6,
    (A) wherein the said dispersion initially contains less than 5% by volume of dispersed material and
    (B) wherein, prior to the said first liquid extraction stage, part of the liquid is extracted from the initial dispersion to reduce the solid content of the dispersion to between 10% and 40% by volume.

8. A process according to claim 6,
    (A) wherein the greater part of the liquid is extracted from the dispersion in the said first stage by evacuation of the said vessel, and
    (B) wherein after the said first liquid extraction stage the said vessel and the die are filled with liquid, and the dispersion thus re-formed within the die is pressed by means of a plunger inserted through the top of the said vessel, (C) the whole process being carried out without exposure of the die and its contents to the ambient atmosphere.

9. A process according to claim 1,
(A) wherein the said dispersion initially contains less than 5% by volume of said dispersed material,
(B) wherein the extraction of liquid from said dispersion is effected in a plurality of stages,
(C) wherein the first of said stages comprises
 (I) placing the initial dispersion in a first die of simple shape and of which at least a part of the wall is formed of said liquid-permeable graphite, and
 (II) applying a pressure difference between the exterior of the said first die and the mass of dispersion within the die such that the dispersion is under higher pressure than the exterior of the die, (a) so that liquid is extracted from the dispersion through the said graphite wall of the die, (b) the residual material retained within the die is formed into a block of said material in plastic, partially regenerated, form (c) containing from 10% to 40%, by volume, of solid material, and
(D) wherein the said block of plastic material is then transferred into a second die
 (I) of which at least a part of the wall is formed of said liquid-permeable graphite and
 (II) which is of the desired shape of the article to be produced, and
 (III) further liquid is extracted from the mass of plastic material through the said graphite of the second die in at least one stage comprising (a) the application of a pressure difference between the exterior of the said second die and the mass of plastic material within said die, (b) such that the plastic material is under higher pressure than the exterior of the die.
 (IV) so that the residual material retained within the second die is formed into the body the shape of which is determined by the shape of the second die;
(E) the liquid extracted through the said graphite walls of both said first die and said second die being removed rapidly from the vicinity of the respective dies.

10. A process according to claim 9,
(A) wherein the first liquid extraction stage comprises the step of applying reduced pressure to the exterior of the said first die while the mass of dispersion within the die is maintained substantially under atmospheric pressure, and
(B) the second and any subsequent liquid extraction stage comprises the step of applying super-atmospheric pressure to the mass of plastic material within the said second die while the exterior of the said second die is under substantially atmospheric pressure.

11. A process according to claim 10,
(A) wherein the said initial dispersion has been prepared by beating a mixture of said material and liquid medium in such a manner that entrainment of an appreciable quantity of air in the dispersion takes place, and
(B) wherein the first liquid extraction stage comprises the steps of
 (I) enclosing the said first die containing the initial dispersion in a vacuum-tight vessel and
 (II) evacuating the said vessel,
 (III) a pressure difference between the exterior of the die and the mass of dispersion within the die being produced by virtue of the pressure exterted on the dispersion by the air entrained therein, and
 (IV) the said entrained air being extracted with the liquid through the said graphite wall of the die.

12. The process for the production of a shaped article of low permeability carbon which comprises:
(A) firstly, preparing a dispersion in a liquid of a material which is a member of the group consisting of cellulosic and hemicellulosic materials, by beating a mixture of the said material and liquid medium in such a manner that entrainment of an appreciable quantity of air in the dispersion takes place,
 (I) said dispersion containing less than 5% by volume of said dispersed material, and
 (II) said dispersed material being in a comminuted state such that it consists of individual fibrils of diameter not greater than one micron and of length not greater than thirty microns;
(B) secondly, extracting the liquid from the said dispersion in a plurality of stages, the liquid extraction process comprising the steps of
 (I) placing the said dispersion in a die of which at least a part of the wall is formed of liquid-permeable graphite having pores on the internal surface communicating with pores on the external surface through channels within the graphite, said pores and channels being of a diameter not greater than ten microns and smaller than the lengths of the fibrils,
 (II) enclosing the said die containing the dispersion in a vacuum-tight vessel and evacuating the vessel, a pressure difference between the exterior of the die and the mass of dispersion within the die being produced by virtue of the pressure exerted on the dispersion by the air entrained therein, (a) so that liquid and the said entrained air are extracted from the dispersion through the said graphite wall of the die and (b) the residual material retained within the die is formed into a shape the exterior of which is determined by the shape of the interior of the die, (c) said residual material within the die being in plastic, partially regenerated form containing from 10% to 40% by volume, of solid material, and
 (III) pressing the said plastic material within the die by means of a plunger inserted through the top of the said vessel, so that further liquid is extracted from the plastic material through the said graphite wall of the die,
 (IV) the liquid extracted through the said graphite wall of the die in both said evacuation and pressing steps being removed rapidly from the vicinity of the die;
(C) thirdly, drying the shaped body produced by said liquid extraction process;
(D) fourthly, subjecting said dried shaped body to a carbonisation heat treatment which comprises the steps of
 (I) heating the dried body slowly to 450° C. (a) in an atmosphere of nitrogen (b) at a pressure of up to 200 atmospheres,
 (II) then heating the body to 750° C in vacuum, and
 (III) finally baking the body at a temperature in the range of 1500° C. to 2600° C. in an inert atmosphere.

13. A process according to claim 12, wherein prior to carrying out the said liquid extraction process, part of the liquid is extracted from the initial dispersion to reduce the solid content of the dispersion to approximately 10% by volume.

14. The process for the production of a shaped article of low permeability carbon which comprises:

(A) firstly, preparing a dispersion in a liquid of a material which is a member of the group consisting of cellulosic and hemicellulosic materials, by beating a mixture of the said material and liquid in such a manner that entrainment of an appreciable quantity of air in the dispersion takes place,
 (I) said dispersion containing less than 5% by volume of said dispersed material, and
 (II) said dispersed material being in a comminuted state such that it consists of individual fibrils of diameter not greater than one micron and of length not greater than thirty microns;
(B) secondly, extracting the liquid from the said dispersion in a plurality of stages, the liquid extraction process comprising the steps of
 (I) placing the dispersion in a first die of simple shape and of which at least a part of the wall is formed of said liquid-permeable graphite,
 (II) enclosing the said die in a vacuum-tight vessel and evacuating the vessel, a pressure difference between the exterior of the die and the mass of dispersion within the die being produced by virtue of the pressure exerted on the dispersion by the air entrained therein, (a) so that liquid and the said entrained air are extracted from the dispersion through the said graphite wall of the die and (b) the residual material retained within the die is formed into a block of said material in plastic, partially regenerated, form containing from 10% to 40%, by volume, of solid material,
 (III) transferring the said block of plastic material into a second die which is (a) of the desired shape of the article to be produced and (b) of which at least a part of the wall is formed of said liquid-permeable graphite,
 (IV) applying superatmospheric pressure to the mass of plastic material within said second die while the exterior of the said die is under substantially atmospheric pressure, (a) so that further liquid is extracted from said plastic material through the said graphite wall of the die and (b) the residual material retained within said second die is formed into a body the shape of which is determined by the shape of the second die,
 (V) the liquid extracted through the said graphite walls of both said first die and said second die being removed rapidly from the vicinity of the respective dies;
(C) thirdly, drying the shaped body so produced;
(D) fourthly, subjecting said dried shaped body to a carbonisation heat treatment which comprises the steps of
 (I) heating the dried body slowly to 450° C. (a) in an atmosphere of nitrogen (b) at a pressure of up to 200 atmospheres,
 (II) then heating the body to 750° C. in vacuum, and
 (III) finally baking the body at a temperature in the range of 1500° C. to 2600° C. in an inert atmosphere.

References Cited

UNITED STATES PATENTS

| | | | |
|---|---|---|---|
| 3,218,377 | 11/1965 | Girmigni | 264—86 |
| 2,936,605 | 5/1960 | Witucki et al. | 25—29 |
| 2,997,744 | 8/1961 | Stoddard et al. | 264—337 |

FOREIGN PATENTS

| | | |
|---|---|---|
| 308,626 | 3/1929 | Great Britain. |
| 889,351 | 2/1962 | Great Britain. |
| 216,064 | 11/1957 | Australia. |

ROBERT F. WHITE, *Primary Examiner.*

J. A. FINLAYSON, *Assistant Examiner.*